United States Patent [19]

Sabella

[11] Patent Number: 5,739,935
[45] Date of Patent: Apr. 14, 1998

[54] MODULAR OPTICAL CROSS-CONNECT ARCHITECTURE WITH OPTICAL WAVELENGTH SWITCHING

[75] Inventor: Roberto Sabella, Rome, Italy

[73] Assignee: Telefonaktiebolaget LM Ericsson, Stockholm, Sweden

[21] Appl. No.: 607,313

[22] Filed: Feb. 26, 1996

Related U.S. Application Data

[63] Continuation-in-part of Ser. No. 555,716, Nov. 14, 1995.
[51] Int. Cl.$^6$ ................................................. H04J 14/02
[52] U.S. Cl. ........................ 359/128; 359/120; 359/121; 359/127; 385/24
[58] Field of Search ........................ 359/124–125, 359/127–128, 117, 120–121, 163; 385/24, 46, 31

[56] References Cited

U.S. PATENT DOCUMENTS 5,194,977  3/1993  Nishio ................................... 359/128

FOREIGN PATENT DOCUMENTS 0 310 058  4/1989  European Pat. Off. .
0 380 126  8/1990  European Pat. Off. .
0 429 046  5/1991  European Pat. Off. .

OTHER PUBLICATIONS

IEEE, Journal of Lightwave Technology, vol. 13, No. 2, "Performance Evaluation of an Optical Multi–Carrier Network Using Wavelength Converters Based on FWM in Semiconductor Optical Amplifiers," by Iannone et al., Feb. 1995, pp. 312–324.

IEEE, Journal of Lightwave Technology, vol. 11, No. 5/6, "A Transport Network Layer Based on Optical Network Elements," by Hill et al., May/Jun. 1993, pp. 667–676.

IEEE, Photonics Technology Letters, vol. 7, No. 4, "Efficiency and Noise Performance of Wavelength Converters Based on FWM in Semiconductor Optical Amplifiers," by Ottavi et al., Apr. 1995, pp. 357–359.

"Optical Wavelength Converters" by Stubkjaer et al., Proceedings of ECOC '94, vol. 2. pp. 635–642.

*IEICE Transactions on Communications*, vol. E77–B, No. 10, "Optical Path Cross–Connect Node Architecture with High Modularity for Photonic Transport Networks," by Watanabe et al., Oct. 1994, pp. 1220–1229.

(List continued on next page.)

*Primary Examiner*—Kinfe-Michael Negash
*Attorney, Agent, or Firm*—Nixon & Vanderhye P.C.

[57] ABSTRACT

An optical cross-connect node architecture interfaces plural optical fiber input and output links, each link containing plural wavelength channels. In one embodiment, the input links are connected to a single optical coupler, or alternatively, to an associated one of plural optical couplers. Pairs of tunable optical filters and optical wavelength converters are each connected to an output port of the optical coupler, or to each of the plural optical couplers, and perform wavelength channel routing and switching in the wavelength domain, i.e., without the need for any optical space switch. In other embodiments, an additional input wavelength converter is connected to each input fiber link to convert the plural wavelength channels on each link to different, noninterferring wavelengths. This prevents wavelength contention in the optical coupler to which the input wavelength converters are connected. New fiber links may be added in modular fashion without significant impact on the pre-existing optical cross-connect structure. Similarly, new wavelength channels may also be multiplexed onto existing fibers to provide wavelength modularity without having to reconfigure the node.

24 Claims, 8 Drawing Sheets

OTHER PUBLICATIONS

*IEEE Journal on Selected Areas in Communications*, vol. 8, No. 6, "Dense Wavelength Division Multiplexing Networks: Principles and Applications," by C. Bracket, Aug. 1990, pp. 948–964.

*Photonic Switching II*, 12–14 Apr. 1990, Kobe, Japan, pp. 286–290, XP000333173, Nishio et al., "Photonic wavelength–division switching network using a parallel lambda–switch".

*IEICE Transactions on Communications*, vol. E77–B, No. 2, Feb. 1994, Tokyo, Japan, pp. 119–127, XP000447102, Murakami et al., "Overview of photonic switching systems using Time–Division and Wavelength–Division Multiplexing".

*Ericsson Review*, vol. 71, No. 3, 1994, Stockholm, Sweden, pp. 134–143, XP000467129, Johansson et al., "An optical transport network layer—Concept and demonstrator".

MODULAR OPTICAL CROSS-CONNECT ARCHITECTURE WITH OPTICAL WAVELENGTH SWITCHING

RELATED APPLICATIONS

This application is a continuation-in-part application of my earlier commonly assigned application Ser. No. 08/555,716 filed on Nov. 14, 1995.

FIELD OF THE INVENTION

The present invention relates to optical communications, and more particularly, to an optical path cross-connect node architecture for optically switching/routing high speed traffic.

BACKGROUND AND SUMMARY OF THE INVENTION

Telecommunications network are providing an ever increasing range of services which require increased capacity from existing telecommunications networks. Because a transport network is large and complex and integrates a number of different technologies and services, a network model with well-defined functional entities is useful for its design and management. Such a layered transport network architecture model includes a circuit layer, a path layer, and a physical transmission media layer. A layered structure makes it easy for each network layer to evolve independently of the other layers. Of particular interest to the present invention are links between the circuit layer and the transmission layer using path layer devices that are referred to as nodes, e.g., an electronic/digital cross-connect (DXC) node. The digital cross-connect node performs such functions as channel demultiplexing down to lower transmission hierarchies in addition to switching and routing at different data rates. To date, optical technologies are employed mainly at the physical layer to transport high speed, time division multiplexed (TDM) digital data streams, e.g., 2.5 Gbit/s data streams.

Compared to the high speeds at which data can be transported over optical links, e.g., 2.5 Gbits/s, the electronic path layer nodes operate at much slower rates, e.g., 155 Mbit/s. To meet the increased capacity needs of the transport network, bottlenecks caused mainly by use of electronic node switching and routing need to be eliminated. An object of the present invention therefore is to eliminate such bottlenecks and add a "transparent" optical layer to the path layer of existing telecommunications networks which uses optical cross-connect (OXC) nodes to perform high speed (e.g., 2.5 Gbits/s) dynamic routing and allocation of wavelength channels. Thus, a signal transmitted from a sending device may be routed through several optical cross-connect nodes at the path level without ever passing through an electrical cross-connect node.

Significant benefits of this network structure are that optical cross-connect nodes route very large amounts of data through the transport network at the path layer without requiring opto-electronic conversion. In addition, high speed transmission over the optical path layer is "transparent" to the network. Not only can traffic be routed through the optical cross-connect at rates much faster than through electronic cross-connects but also the optical layer transmission rate can be easily increased, e.g., from 2.5 Gbits/s to 10 Gbits/s, without impacting the optical layers that make up the basic path layer. In this way, the network can be upgraded to a much higher traffic transport rate through the optical cross-connect nodes without modifying the optical cross-connect node structure.

An optical cross-connect node that employs an optical space switch matrix to perform channel switching suffers from a number of drawbacks. First, optical space switches are relatively expensive so the initial cost of implementing an optical cross-connect node is high. Second, space switches are complicated devices. In fact, adding capacity to a node means adding an enormously more complicated space switch. Third, space switches are inflexible. Fiber optic links cannot be modularly added to an existing space switch. Instead, for newly added links, a new space switch must be designed and installed at very high cost. A fourth drawback relates to cross-talk present in optical switch matrices.

An important issue for any cross-connect node, including optical cross-connects, is the ability of that node to provide continuous service. Unfortunately, node maintenance and repair tasks as well as node upgrade operations typically require a node to be disabled while those tasks/operations are performed. During the period the node is disabled, traffic cannot be routed to, through, or from that node.

It is an object of the present invention to provide an optical cross-connect node architecture that is economical, simple, and flexible.

It is an object of the present invention to provide an optical cross-connect node architecture that provides both optical link modularity and wavelength modularity.

It is a further object to achieve such modularity without significantly impacting the existing architecture so that individual fiber links and/or wavelengths can be added on an as needed basis without having to reconfigure the node.

It is a further object to provide a optical cross-connect architecture that provides wavelength switching and routing without requiring use of an optical space switch.

It is an object of the present invention to employ photonic, wavelength conversion to avoid wavelength contentions in the node (thereby permitting wavelength reuse) and to permit multicasting of wavelength channels to any wavelengths and/or optical fibers used in the network.

It is an object of the invention to provide a highly flexible optical cross-connect architecture that permits continued switching and routing of traffic without disruption even when node maintenance and upgrade tasks are performed.

Using photonic, wavelength converters and tunable optical filters to switch and route wavelength channels through an optical cross-connect node, the present invention eliminates the need for space switches to effect selective traffic routing/switching/multicasting functions. Eliminating the need for optical space switches from the optical cross-connect considerably reduces the costs of implementing an optical, cross-connect node. In addition, the optical cross-connect node architecture of the present invention provides considerable design flexibility and even further economy because of its modularity. Modularity is particularly desirable because, as optical path layers are added to existing networks, it is likely that initial capacity demands will be relatively small, and as a result, cost will be a significant factor in upgrading existing networks or establishing new networks. Modular costs limited to each link or wavelength added are more acceptable than the costs associated with replacing other existing and expensive components in the node like a space switch. Using the present invention, the transport network capacity at the path/node level can be easily increased by simply adding new links and/or wavelength channels without having to replace complex, expensive devices already existing in the node at considerable effort and cost.

The modular optical cross-connect node architecture includes plural optical fiber input links each containing plural wavelength channels. Each fiber link is connected to an input port of an optical coupler such as (but not limited to) a star coupler. In contrast to an expensive space switch which is an "active" switching device, the star coupler is inexpensive and a passive device. Each output port of the optical coupler is connected to a tunable optical filter which is tuned to a wavelength of the channel to be connected to an output fiber. Accordingly, the tunable filter, by being tuned to a particular wavelength, selects or routes a wavelength channel having that particular wavelength from an output port of the optical coupler to an output optical link. This operation is referred to as wavelength channel routing.

The tunable filter output is connected to a corresponding wavelength converter which performs what is referred to as wavelength channel switching. In other words, the wavelength converter shifts, if desired, the input wavelength to a different output wavelength. As a result, the information contained on one wavelength channel may be "switched" to another wavelength channel. Output signals from each wavelength converter are combined at various combiners nodes to multiplex plural wavelength channels onto a single optical fiber link, i.e., wavelength division multiplexing. No optical space switch is required because the wavelength channels are switched in the wavelength domain rather than in the space domain. A digital/electronic cross-connect may also be coupled to the optical cross-connect at the optical coupler through electro-optical transmitters and receivers.

In a second embodiment, the highly modular, optical cross-connect node interfaces plural optical fiber input links and plural optical fiber output links which each contain plural wavelength channels. Each input link is connected to an input wavelength converter for translating an input set of wavelength channels wavelength division multiplexed (WDM) onto a single input optical fiber link (referred to as a "WDM comb" of wavelength channels) to another set of wavelengths. The output of each input wavelength converter is connected to an input port of an optical coupler. By properly translating the input WDM combs to different, noninterferring wavelengths, optical wavelength contentions in the optical coupler are avoided. Each output port of the optical coupler is connected to a corresponding pair of a tunable optical filter and a wavelength converter for routing a desired wavelength channel from the optical coupler to an output link and translating the routed wavelength to an original input wavelength. The wavelength channel outputs from various wavelength converters are multiplexed onto an optical fiber link via corresponding optical combiner.

An advantage of this modular optical cross-connect architecture is that new fiber links may be easily and inexpensively added in a modular fashion. More specifically, all that is needed to add a new optical fiber link is to add optical components associated with the new link: an input wavelength converter (in the second embodiment), one or more output tunable filters (depending on the number of wavelength channels carried by the new link), one or more output wavelength converters (depending on the number of wavelength channels carried by the new link), and an output combiner. If the optical coupler has extra input and output ports, the existing optical coupler may be used. Even if all of the optical coupler ports are used, the existing coupler need only be replaced with a new, larger capacity, optical coupler. Because passive optical couplers are relatively inexpensive, the addition of the new fiber link which does require a new optical coupler nonetheless has very small impact on the existing structure of the optical cross-connect node. Similarly, the number of wavelengths carried on each fiber can be easily increased in an inexpensive manner. Each new wavelength channel requires only that an additional output tunable filter/wavelength converter pair. In other words, for each newly added wavelength channel, there needs to be one tunable filter/wavelength converter pair added to an output of the optical coupler. The existing pairs of tunable filters/wavelength converters are not affected. Again, the only component that may need to be changed is the optical coupler so that it includes as many output ports as the total number of wavelength channels.

In still another even more flexible configuration of the present invention, the highly modular, optical cross-connect node interfaces plural optical fiber input links and plural optical fiber output links which each contain plural wavelength channels. Each input link is connected to an optical splitter which generates plural copies of the received signals. A plurality of optical couplers are provided with one optical coupler being provided for each fiber link. Each of the optical couplers receives a copy of the optical signals generated from each optical splitter from all input fiber links. Assuming the input signals occupy different wavelengths or by translating the input signals to different common non-interfering wavelengths using an input wavelength converter, optical wavelength contentions in each of the optical couplers are avoided. The output from each of the optical couplers is provided to tunable optical filters and wavelength converter pairs for routing a desired wavelength channel to an output link and translating the routed wavelength to an original input wavelength. The wavelength channel outputs from the wavelength converters are then multiplexed onto an optical fiber link via corresponding optical combiner.

An advantage of this optical cross-connect architecture is that the architecture is not limited by a single, relatively complex optical coupler. Rather than having to replace the single coupler with a new larger capacity optical coupler each time the optical cross-connect node is upgraded to handle new links or wavelength channels, smaller, less complex optical couplers may be added to the optical cross-connect node. Another advantage is that while the cross-connect node is being upgraded to provide additional capacity, the optical cross-connect node is not disabled because some number of the optical couplers remain enabled during the upgrade process. Likewise, when individual components in the optical cross-connect node must be temporarily taken out of service for maintenance and/or repair, the node continues to function using those optical couplers which are not affected by that maintenance and/or repair. Thus, optical coupler complexity is reduced, node upgrades are performed modularly, and node maintenance and upgrades can be performed without disrupting traffic through the node. Therefore, using the architectures disclosed herein, new wavelengths and/or links can be modularly added in simple fashion.

Another advantage of the various architectures in accordance with the present invention is the multicasting of a single input wavelength channel to multiple output wavelength channels and fiber links. One beneficial application includes generating an original signal at a central location and broadcasting that signal from one optical cross-connect node over the transport network to other cross-connect nodes located in different geographical locations.

These and other objects and advantages of the invention will now be described further below in conjunction with the drawings.

DETAILED DESCRIPTION OF THE DRAWINGS

In the following description, for purposes of explanation and not limitation, specific details are set forth, such as particular circuits, circuit components, interfaces, techniques, etc., in order to provide a thorough understanding of the present invention. However, it will be apparent to one skilled in the art that the present invention may be practiced in other embodiments that depart from the specific details. In other instances, detailed descriptions of well-known methods, devices, and circuits are omitted so as not to obscure the description of the present invention with unnecessary detail.

Figure 1:
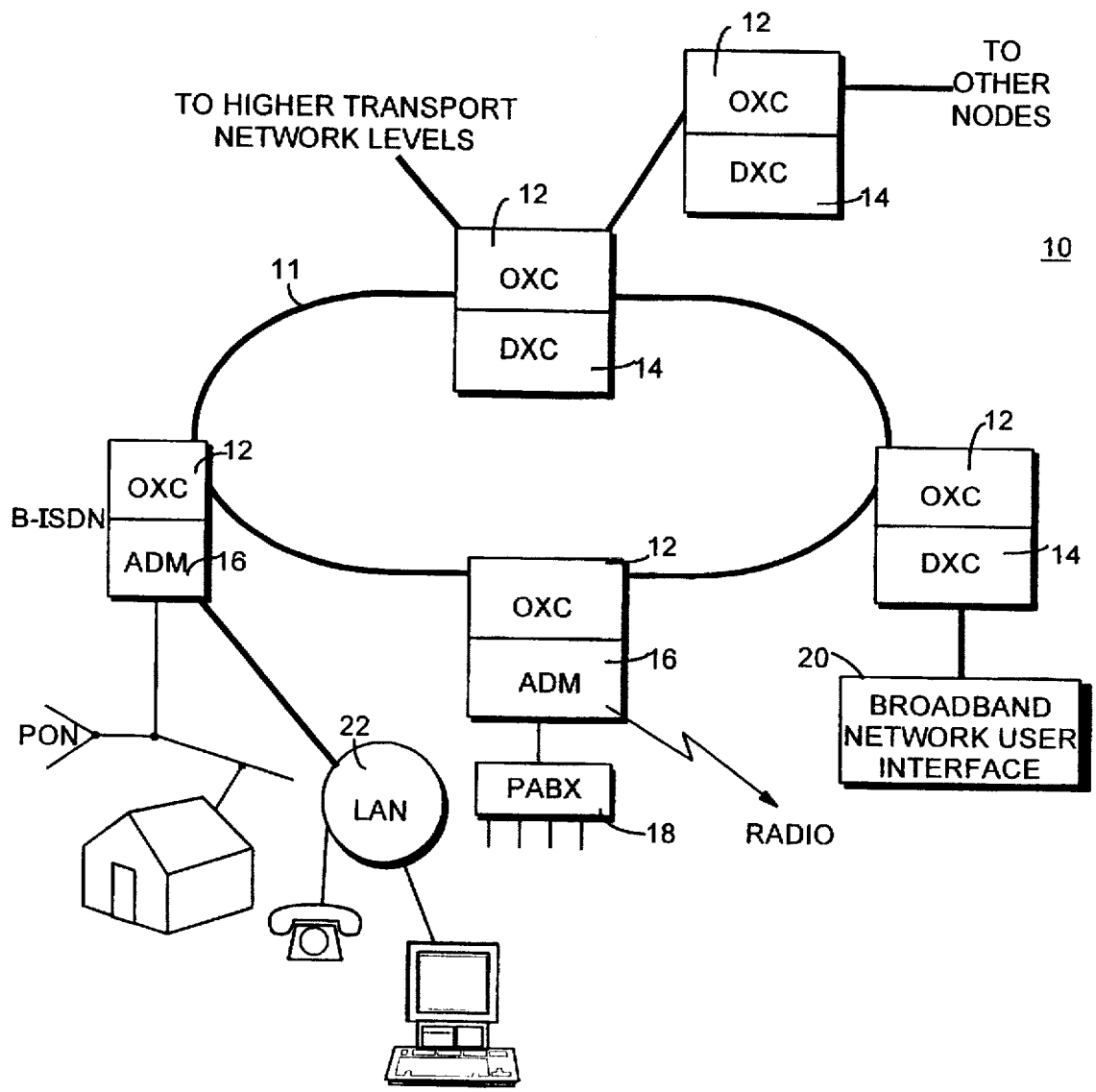
FIG. 1 is a diagram illustrating an optical communications layer in a local transport communications network.

Referring to FIG. 1, a transport network that is readily adaptable to future evolution in network topologies and transmission formats includes a "transparent" optical layer 10. Transparent means that the optical layer does not affect and is otherwise invisible to the data rates and transmission formats used on the existing electrical layer of the network path. The optical layer 10 is added to the path layer of the transport network through a number of flexible network nodes that interface an optical link 11 (optical links are illustrated as thick, bold lines) with optical cross-connect nodes 12 (sometimes simply referred to as optical cross-connects (OXCs)). In general, the OXCs 12 allow dynamic routing and switching/allocation of optical wavelength communications channels at very fast speeds (each optical wavelength carries a single traffic channel). The traffic signals, although typically digital in nature, may also include analog signals. For purposes of explanation only, however, the present description assumes that the traffic consists of high speed digital bit streams.

Demultiplexing and routing at lower/slower bit rate transmission hierarchies is accomplished by switching the signals from the optical layer to electronic/digital cross-connects (DXCs) 14 using electro-optical transceivers (not shown). For example, the DXCs perform time division demultiplexing of signal channels carried in one traffic channel and perform routing, switching, and other digital processing functions at considerably slower speeds. A number of potential network applications are shown interfaced by OXCs to the optical network 11 including a user interface to the electronic broadband network 20, interface with a private automatic branch exchange (PABX) 18 via an add/drop multiplexer (ADM) 16, access to the broadband-ISDN (B-ISDN), homes, and interface to smaller networks like local area network (LAN) 22.

While photonic switching in the space and wavelength domains may be advantageously employed to increase capacity in existing and broadband communication systems, photonics is not particularly well suited to perform data processing and data storage functions which can be more optimally performed by the electronic layer. With this combined node architecture, the "best" features of both (1) optical and (2) electronic technologies are utilized: (1) relatively simple optical routing and switching of general traffic channels at very high speeds and (2) more complicated electronic routing, switching, and processing of individual signal channels at slower speeds. By using photonic and electronic techniques in this kind of complementary manner, the total traffic throughput of the network is considerably increased. Moreover, optical cross-connects transparently route large blocks of traffic not only at high speeds but also with high efficiency because opto-electronic conversions are not required for straight forward traffic transmission through the path node over the transport network.

Wavelength division multiplexing (WDM) is used to establish multiple, independent optical channels on a single fiber. In contrast to time division multiplexing (TDM) used to optimize copper wire and radiowave channel bandwidth, fiber bandwidth is most easily accessed in the wavelength domain directly. In concept, wavelength division multiplexing couples or multiplexes separate channel sources into a single communications fiber and separates or demultiplexes the signals out of the single fiber. Fundamentally, wavelength division multiplexing is the same as frequency division multiplexing as that term is used in electrical (copper) or electromagnetic (radio) transmission systems. Of course, the relationship $V = F \times \lambda$ relates wavelength to frequency.

Figure 2:
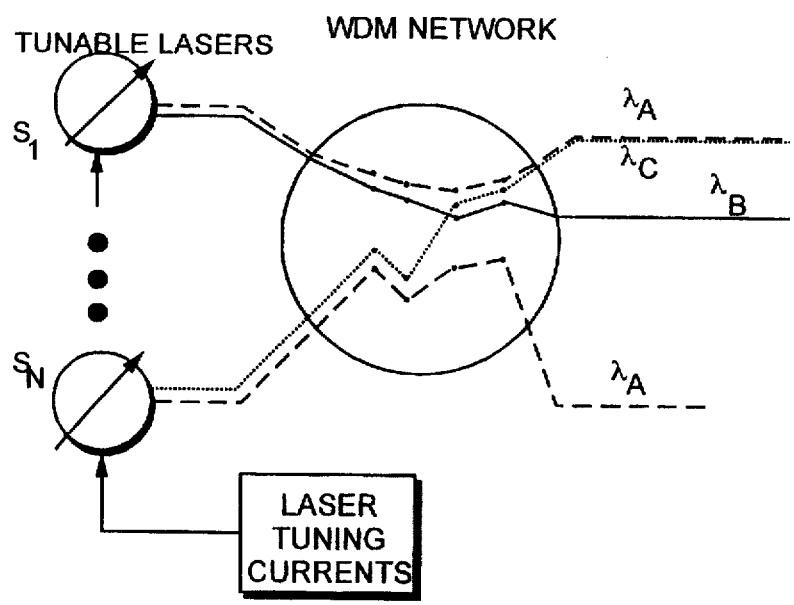
FIG. 2 is a diagram of a wavelength routing network.
Figure 3:
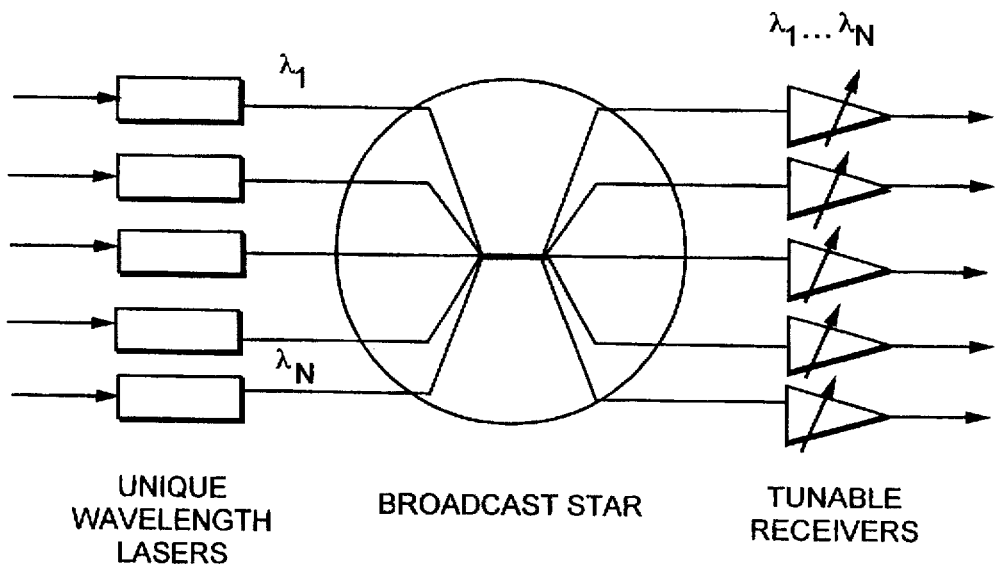
FIG. 3 is a diagram of a broadcast-and-select network with fixed wavelength lasers and tunable receivers.

Two general architectures that may be used in WDM networks are wavelength routing networks and broadcast-and-select networks are illustrated in FIGS. 2 and 3. A wavelength routing network shown in FIG. 2 is composed of one or more wavelength selective elements such as tunable lasers. The path that a signal makes through the network is determined by the wavelength of the signal and the input port at which the signal enters the network. The N tunable laser sources ($S_1-S_N$) controlled by appropriate tuning currents are interconnected with N wavelength independent receivers (not shown) through a WDM network. By tuning to a selected wavelength, the signal from a given laser can be routed to a selected output. A broadcast and select network, shown in FIG. 3, combines all of the unique wavelength laser inputs in a star coupler and "broadcasts" them to all outputs. The architecture is based on fixed or tunable input lasers and fixed or tunable output receivers.

The present invention uses wavelength division multiplexing and accomplishes optical routing and switching of multiplexed wavelength channels using tunable filters, wavelength converters and optical couplers without using an optical space switch. Using the optical cross-connect architecture of the present invention, an input wavelength channel may be assigned to any other wavelength channel on a link-by-link basis. This "virtual" wavelength path (VMP) technique is advantageous because it minimizes the total number of required wavelengths in the network. On the other hand, in a simpler wavelength path (WP) scheme, one wavelength is associated with a signal as it is routed through many nodes in its path through the network the assigned wavelength does not change. Accordingly, a larger number of wavelengths are required. In the virtual wavelength path scheme, the wavelengths are allocated on a link-by-link basis, and therefore, the wavelength of the optical path is converted node-by-node. As a result, a smaller number of total network wavelengths are required in the virtual wavelength path scheme. However, this virtual wavelength path scheme requires wavelength conversion in the optical cross-connect node.

Different methods/devices may be used to obtain optical wavelength conversion in the optical cross-connect node. Most optical wavelength conversion devices exploit nonlinear effects of semiconductor devices. Examples of optical wavelength conversion methods that may be employed in the present invention include all-optical and opto-electronic wavelength converters. Specific examples include: gain saturation in semiconductor optical amplifiers (SOA), refractive index modulation in a semiconductor optical amplifier on a branch of a Mach-Zehnoler interferometer, and four wave mixing (FWM) in the semiconductor optical amplifiers. These specific wavelength conversion methods present a large detuning bandwidth and optical control of detuning via tunable lasers. However, if opto-electronic converters are employed, transparency to bit rate and transmission format is lost. For purposes of simplifying the explanation of the present invention, only the following description is based on an example using four wave mixing in a semiconductor traveling wave optical amplifier type wavelength converters. In addition, this type of wavelength converter is advantageous because it permits frequency translation independent of signal modulation format, processes very high bit rate signals, (i.e., above 40 Gbit/s), and can wavelength translate an entire wavelength division multiplexed "comb" or set of wavelengths present on an optical fiber. Moreover, FWM converters can be used to translate analog signals, e.g., CATV signals.

Figure 4:
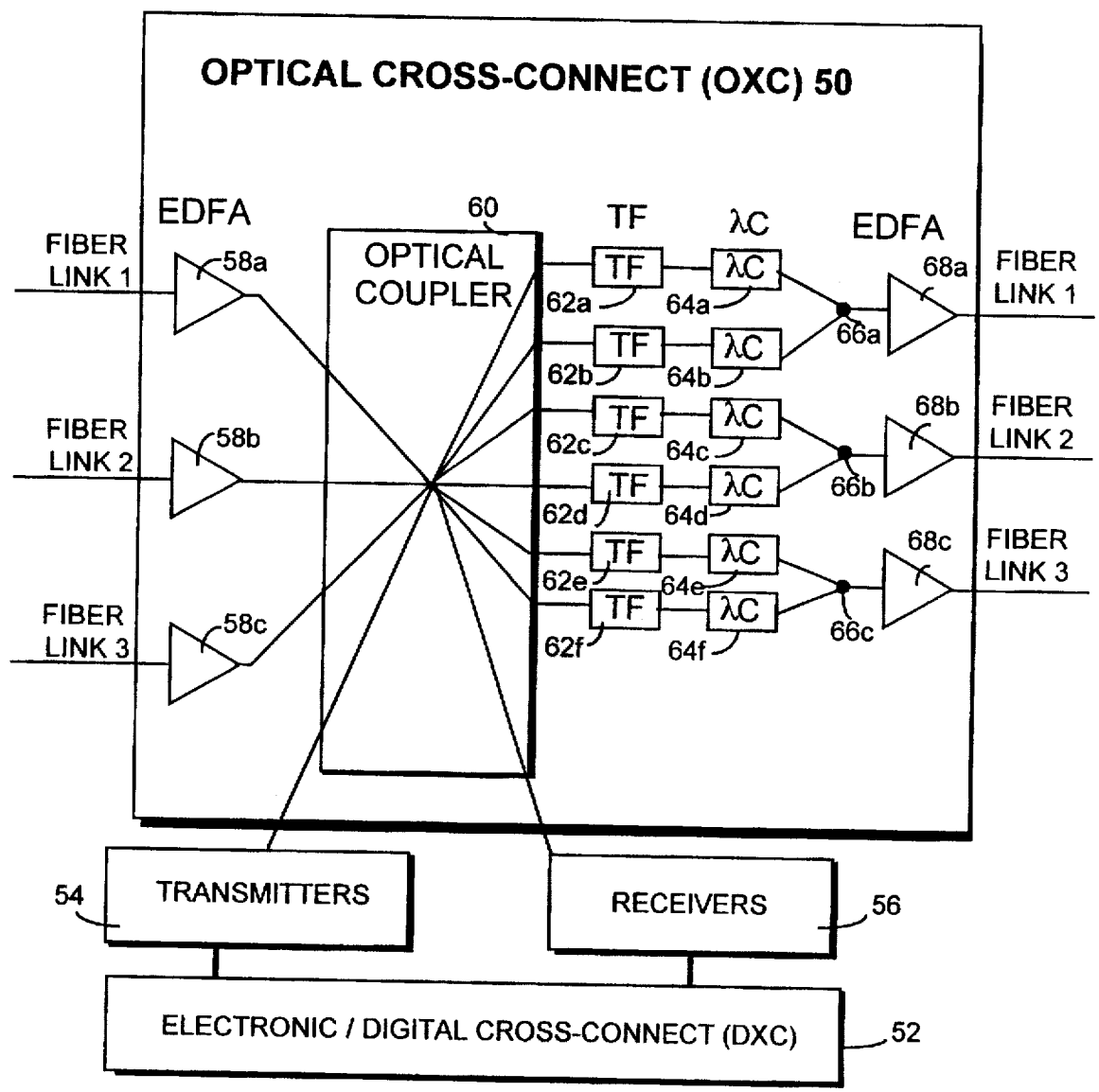
FIG. 4 is a function block diagram of an optical cross-connect that employs wavelength switching in accordance with a first embodiment of the present invention.

An optical cross-connect architecture for effecting pure wavelength switching in accordance with a first embodiment of the present invention is now be described in conjunction with FIG. 4. In this optical cross-connect architecture, wavelength channel routing and switching is entirely performed in the wavelength domain using tunable filters and wavelength converters. For purposes of explanation only, three optical fiber input links are connected to the optical cross-connect 50 with each fiber link carrying plural wave division multiplexed channels. Of course, more than three links could be accommodated. In this first embodiment, in order to avoid channel contentions within the optical cross-connects, the carrier wavelength "combs" multiplexed onto different optical fiber links must (before entering the optical cross-connect 50) already occupy adjacent, non-overlapping portions of the optical spectrum. The same configuration of three output optical fiber links are shown leaving the optical cross-connect 50.

The optical signals on each fiber link may be amplified using suitable optical amplifiers 58a, 58b, ... 58n, such as erbium-doped fiber amplifiers (EDFAs). Similarly, output EDFA amplifiers 68a, 68b, ... 68n may be provided to amplify the output signals generated by the optical cross-connect. Although these amplifiers are not essential to the optical cross-connect architecture, they are desirable to boost the signal level because of the combined losses of the fiber path and the components in the optical cross-connect node.

The wavelength channels coming from the input fiber links 1, 2, and 3, as well as optical wavelength channels locally generated by electro-optical transmitters 54 connected to digital cross-connect (DXC) 52, are combined by a single optical coupler 60, such as a star coupler, that broadcasts the combined signal to each of the couple's output ports. The star coupler outputs are grouped into 3 groups of N outputs, (N being the number of wavelength channels), one group for each output fiber. This means that the entire set of wavelength channels entering the node is made available on each output port of the optical coupler. As a result, any wavelength channel may be routed from any input fiber to any wavelength channel of any output fiber link.

The outputs of the optical coupler 60 are connected to respective tunable filters 62. Six tunable optical filters 62a–62f are shown to illustrate the nonlimiting, simple example where each input and output fiber link includes two wavelength channels. As a result, there are a total of six (3 links×2 channels) possible wavelengths to be selectively routed to any one of the output links. Of course, more than two wavelength channels may be multiplexed on to a single fiber. Each output port of the optical coupler 60 then is connected to one of the tunable optical filters 62a–62f which is tuned to one of the six possible wavelength channels. Accordingly, the tunable filter 62, by being tuned to a particular wavelength, selects or routes a wavelength channel having that particular wavelength from the optical coupler 60 to its output optical fiber link, i.e., wavelength channel routing.

Each tunable filter's output is connected to a corresponding wavelength converter 64a–64f which performs wavelength channel switching. In other words, the wavelength converter shifts, if desired, the input wavelength to a different output wavelength. As a result, the information contained on one wavelength channel is "switched" to another wavelength channel. Of course, the wavelength converter need not switch the wavelength if the channel is already at the desired wavelength. Output signals from each wavelength converter 64a–64f are combined at corresponding combiners 66a–66c to multiplex plural wavelength channels onto a single optical fiber link, i.e., wavelength division multiplexing. In this nonlimiting example, since there are two wavelength channels per link, each combiner multiplexes two frequency converter outputs onto a single output link.

No optical space switch is required because the wavelength channels are switched in the wavelength domain rather than in the space domain. The use of wavelength converters as switching elements increases network flexibility, simplifies management of the network, and reduces the cost of the optical cross-connect.

Any suitable tunable filter could be used for elements 62a–62f such Fabry-Perot and acousto-optic filters and active filters on Distributed Bragg Reflector (DBR). These devices have the advantages of optical gain, narrow filter linewidth, and potential for multifunctionality as well as monolithic integration with other opto-electronic devices.

Figure 5:
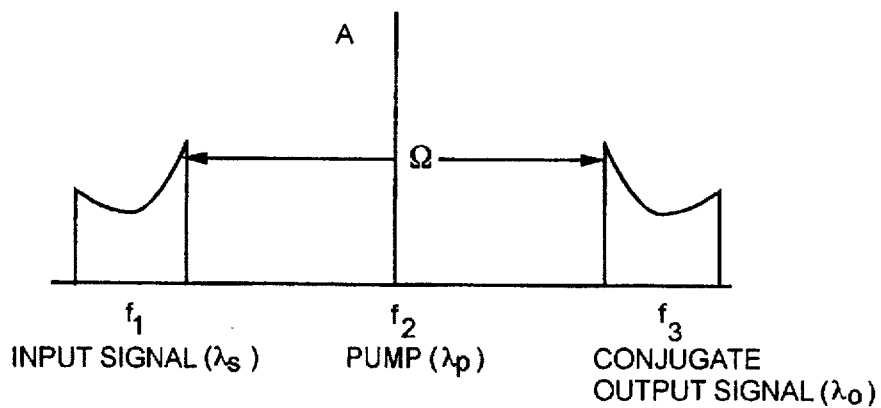
FIG. 5 is a diagram to illustrate the principles of operation of a wavelength converter.
Figure 6:
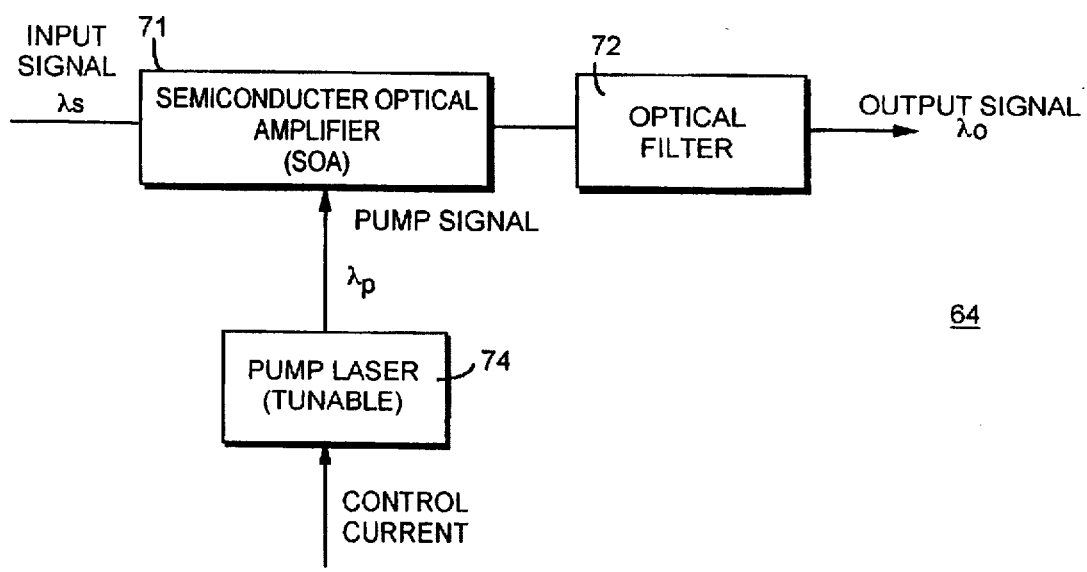
FIG. 6 is a function block diagram illustrating example control of a four wave mixing semiconductor optical amplifier wavelength converter for use in the invention.

An example wavelength converter based on four wave mixing (FWM) in semiconductor traveling wave amplifiers (SOAs) is now described in accordance with FIGS. 5 and 6.

Four wave mixing is a nonlinear effect that takes place when two waves at different wavelengths are injected into a semiconductor optical amplifier. Referring to FIG. 5, a frequency converter based on FWM in an SOA is obtained by injecting at the SOA input an input signal $\lambda_s$ to be converted (centered at frequency $f_1$) and an optical pump $\lambda_p$ (at frequency $f_2$) with the same linear polarization. Material optical nonlinearities in the SOA produce a third output field $\lambda_o$ (which is the conjugate of the input signal $\lambda_s$ centered at frequency $f_3$) shifted in frequency by $\Omega=f_3-f_1$ which is the detuning between pump and input signal. The field at frequency $\lambda_o$ has the same spectrum of $\lambda_s$ (but with a reverse frequency spectrum) so that the signal modulation is preserved, and the carrier wavelength of $\lambda_s$ is translated by a conversion interval $\Delta\lambda=\lambda_o-\lambda_s$.

Different physical phenomena can cause four wave mixing in a semiconductor optical amplifier including carrier density pulsation induced by pump signal "beating" (i.e., referring to beat frequency) inside the active region or by nonlinear gain and index saturation due to intraband carrier dynamics. When the input signal is injected into a laser at frequency $f_1$ which is slightly detuned with respect to the lasing or pump frequency $f_2$, a modulation is produced at the beat frequency of the carrier density, and consequently, of both the gain and refractive index. The frequency (through the refractive index) and the intensity (through the gain) modulations of the field generate two sidebands in the spectrum. One of them is the same frequency as the injected field, and the other is at a frequency of $2f_2-f_1$. When the injected field is modulated at low frequency with respect to the difference between $f_1$ and $f_2$, the output of the new frequencies are also modulated. The modulation is the conjugate $f_3$ of the input signal $f_1$ if the gain nonlinearity is independent of frequency.

An example frequency conversion scheme is shown in FIG. 6. Input optical waves including the signal $\lambda_s$ and the pump $\lambda_p$ are coupled to a semiconductor optical amplifier 71. The pump signal is generated by a tunable pump laser 74 regulated by an appropriate control current. Thus, by changing the control current and therefor the pump, the wavelength translation mount is easily changed. The input signal and the pump have a frequency difference of $\Omega$ and when combined, as described above with respect to FIG. 5, induce a modulation of the carrier density at that frequency difference. The modulation affects the entire gain spectrum because of the homogeneity of the gain saturation. The input signal can be translated to any other wavelength in the optical spectrum. The optical filter 72 is tuned to suppress the pump and original signal from the SOA output to leave only the wavelength translated output signal.

The FWM SOA wavelength converter can be used to wavelength convert a single wavelength channel or an entire comb/set of wavelength channels by an amount $\Omega$. The FWM conversion process is independent of the signal or its spectrum. As a result, an intensity modulated signal, a WDM comb of intensity modulated signals, and even analog signals can be wavelength converted using this FWM conversion process.

Figure 7A:
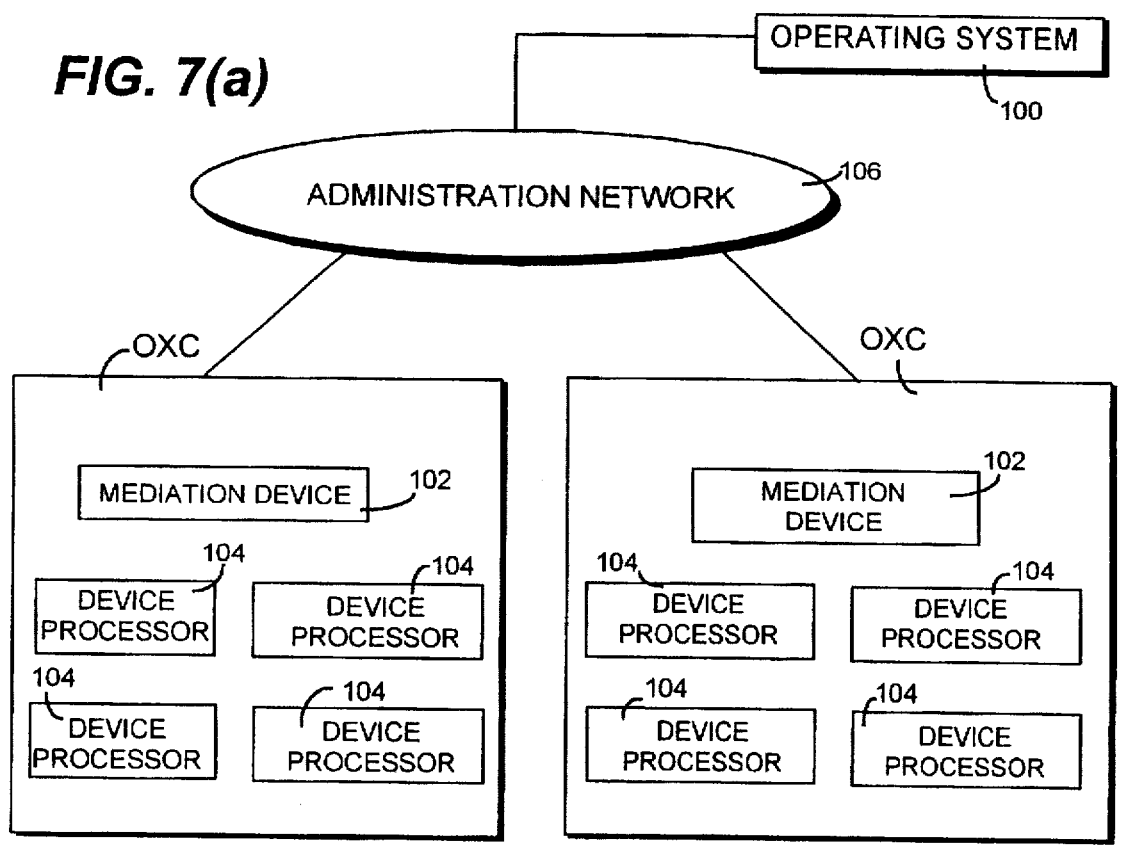
FIG. 7(a) is a function block diagram of a management system for controlling an optical cross-connect.
Figure 7B:
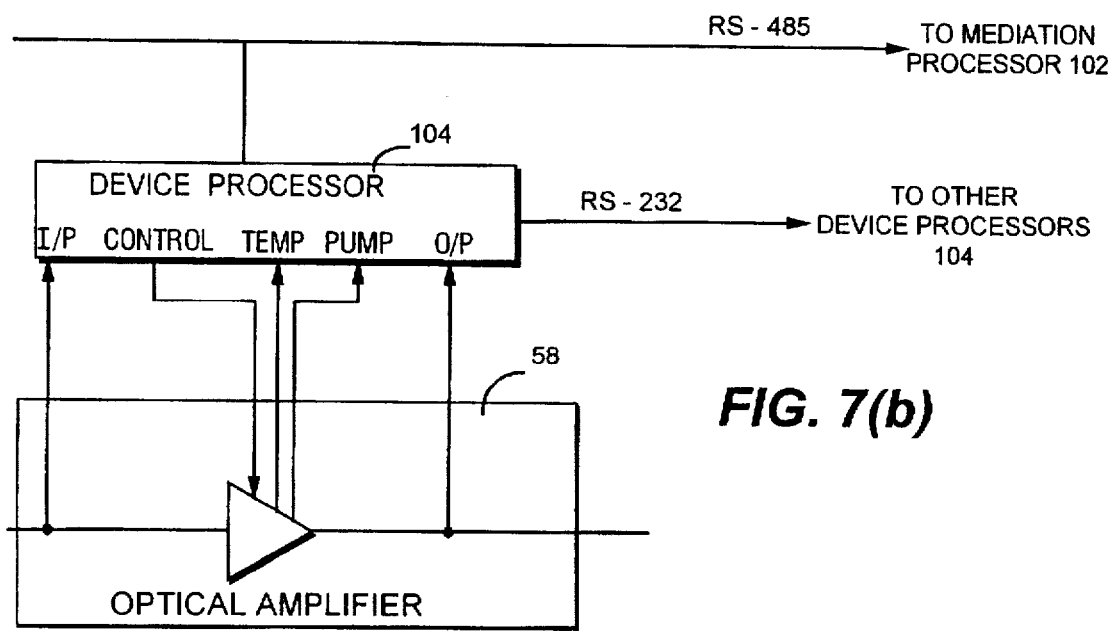
FIG. 7(b) is a function block diagram showing example control of an individual optical device.

FIGS. 7A and 7B illustrate a management system architecture for controlling a plurality of optical cross-connects. The management architecture includes three processor layers including the operating system 100, mediation devices 102, and device processors 104 connected over a separate "administration network 106". The operating system 100 allows an operator to reconfigure the network, set up protection paths, and supervise status. A man machine interface may be provided at the operating system 100 to graphically display the overall network configuration or the configuration of individual nodes. Configuration management automatically establishes channels between the end terminals in the network by allocating appropriate wavelength channels and setting up connections automatically using a routing algorithm that calculates and automatically selects free paths and channels. One mediation device is located at each cross-connect node and distributes commands for the operating system to the device processors. The principle task of the mediation device is to maintain the communication link; however, additional functionality may be allocated to the mediation devices, e.g., control of signal level equalization across the node.

One mediation device 102 is located at each cross-connect node and distributes commands from the operating system 100 to the device processors 104. A principle task of the mediation device 102 is to maintain this communication link, but the mediation devices may also perform other functions such as control signal equalization across a node. Communication between each mediation device and device processors is accomplished over an RS-485 bus. Device processors 104 in each optical cross-connect control and monitor all necessary parameters. For example, in the case of optical amplifiers, input and output power, pump power currents, and temperature may all be monitored. Consider the optical amplifier shown in FIG. 7. The input power, output power, pump power current, and temperature may all be monitored as indicated. The device processor 104 processes both analog and digital signals and connects to other device processors using an RS-232 bus.

Figure 8:
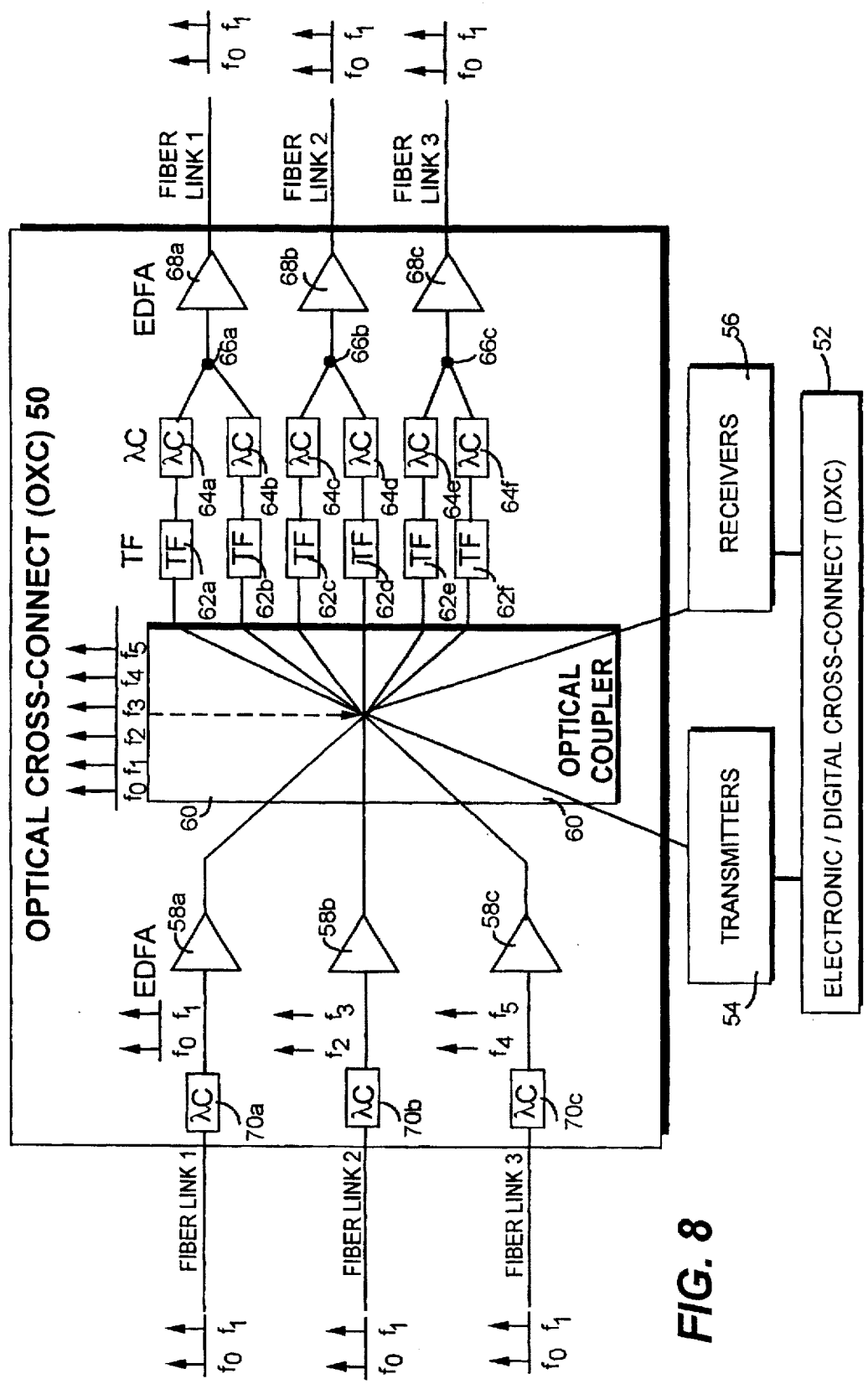
FIG. 8 is a function block diagram of a highly modular optical cross-connect architecture using wavelength switching in accordance with a second embodiment of the present invention.

A second embodiment of a modular optical cross-connect architecture will now be described in accordance with FIG. 8 where similar elements from FIG. 4 have similar reference numerals in FIG. 8. One of the drawbacks of the optical cross-connect architecture shown in FIG. 4 is that wavelength contentions occur in the star coupler 60 if the input fiber links carry the same wavelengths. Therefore, wavelength reuse is prevented in the network because all of the wavelength channels must be different to avoid such contention in the node. FIG. 8 illustrates wavelength/frequency reuse in the network in that each of the input links 1, 2, and 3 includes similar frequencies (corresponding to wavelengths) f0 and f1. Again, for purposes of illustration, only three fiber links and two wavelength channels per link are shown.

Four wave mixing in semiconductor optical amplifiers performs two significant functions in the OXC architecture shown in FIG. 8: photonic switching and wavelength contention avoidance. The photonic switching function performed in the FIG. 8 architecture was already described above in conjunction with the description of the OXC architecture of FIG. 4. With respect to the latter function, the use of wavelength converters avoids wavelength contentions that would occur at a node when two channels at the same wavelength are routed to the same node output. By shifting the wavelength of one of the channels to a different wavelength, such contention is avoided thereby achieving a more reliable and flexible optical network. In a situation where plural wavelength channels are multiplexed onto one link, FWM SOA wavelength converters are used to shift the entire WDM comb on each fiber link before the channels mix in the optical coupler.

In accordance with this second embodiment of the present invention, input wavelength converters 70a, 70b, and 70c shift the input frequencies of each optical wavelength channel to a different set of frequencies. As with the example used with respect to FIG. 4, the example in FIG. 8 assumes only three fiber links with each link carrying only two wavelength channels. However and in contrast to FIG. 4, the two wavelength channels on each input fiber link in FIG. 8 are the same—f0 and f1. Of course, a much larger number of links and wavelength channels could be used. Thus, the comb of input frequencies f0 and f1 on each fiber link may be shifted by its wavelength converter 70 to another comb or set of frequencies. In the example, the input wavelength frequencies f0 and f1 on optical link 1 are not translated by wavelength converter 70a (although they could be if desired). The wavelength channels f0 and f1 on optical link 2 are converted in wavelength converter 70b to frequencies f2 and f3, respectively. The wavelength channels f0 and f1 on optical link 3 are converted in wavelength converter 70c to corresponding frequencies f4 and f5 which are different from frequencies 2 and 3. As a result, individual wavelength channels coupled in optical coupler 60 do not collide/ contend. To accomplish wavelength translation of such simplified WDM combs, FWM SOA wavelength converters are used.

The pairs of tuning filters 62a–62f and wavelength converters 64a–64f already described above with respect to FIG. 4 perform routing of different channels to the output fibers and wavelength switching in the wavelength domain, respectively The wavelength converters 64a–64f may, if desired, translate the f2 and f3 channels as well as the f4 and f5 channels back to the corresponding f0 and f1 frequencies (wavelengths) which were received by wavelength converters 70. This feature permits the node wavelength switching function to remain transparent outside the node. Similarly, the outputs from pairs of wavelength converters are combined in respective combiners to reconstitute the WDM channels on each link.

There are some drawbacks with the architectures of the first and second embodiments using a single optical coupler 60 to perform optical coupling between input and output fiber links. One drawback relates to the complexity of the optical coupler. It is considerably more difficult and expensive to construct a reliable optical coupler as the number of wavelength channels increases. For example, if each input fiber link carries eight channels rather than two channels, an optical coupler having only three input ports for three input links would need to have twenty-four output ports.

Another drawback to using a single optical coupler is that during maintenance, repair, or upgrade of an optical cross-connect node, the node must be disabled causing undesirable disruption of traffic into and from that node. Since all of the wavelength channels from all links pass through the single optical coupler, disabling that coupler from service for any reason, (such as to replace a fully-loaded existing optical coupler with a higher capacity optical coupler, to connect a new link to existing input/output ports of the optical coupler upgrading the capacity of the node, to replace a faulty component in the optical cross-connect node such as wavelength converter, tunable filter, or combiner, etc.), means that no traffic may be routed through the optical cross-connect node.

Such a disruption is problematic for two reasons. First, information cannot be routed from other optical cross-connect nodes in the transport network through the optical cross-connect 50. Second, information cannot be communicated to or from the electronic/digital cross-connect 52 which interfaces with the transport network using the optical cross-connect 50.

Figure 9:
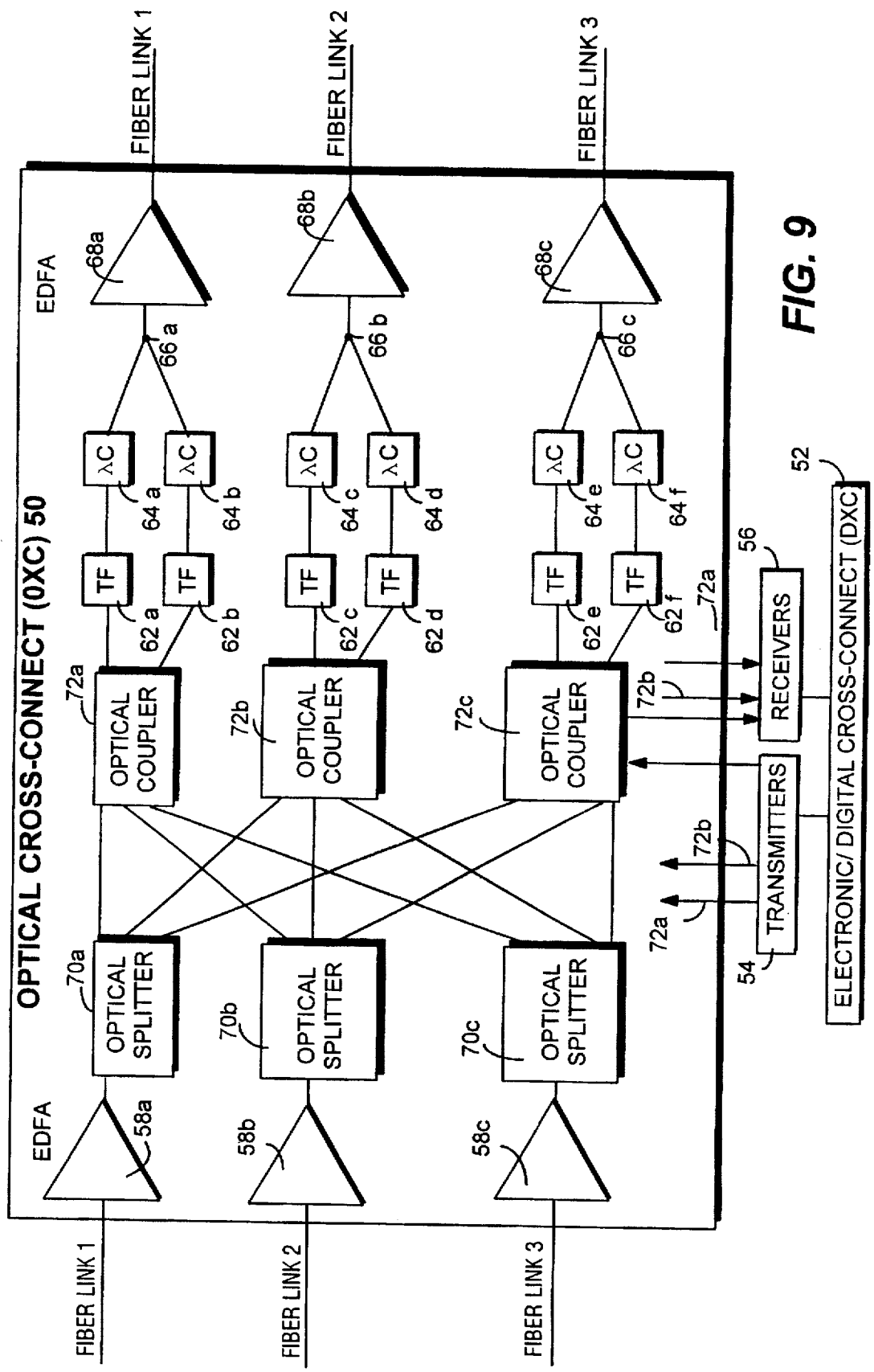
FIG. 9 is a function block diagram of a highly modular optical cross-connect architecture using wavelength switching in accordance with the third embodiment of the present invention.

FIG. 9 illustrates an example of a third embodiment of the present invention which provides a solution to these drawbacks. The optical cross-connect node architecture of the third embodiment is similar to that of the first embodiment. However, the third embodiment employs plural optical couplers rather than a single optical coupler. Comparing FIGS. 4 and 9, optical couplers 72a, 72b, and 72c are used rather than a single optical coupler 60. Each fiber link has its own associated optical splitter 70. Optical splitter 70a receives wavelength channels multiplexed onto fiber link 1 (preferably amplified in amplifier 58a) and divides the received optical energy into three paths which are connected to input ports of optical couplers 72a, 72b, and 72c. Similarly, optical splitter 70b routes wavelength channels from fiber link 2 and optical splitter 70c routes wavelength channels on fiber link 3 to all three optical couplers. The digital cross-connect 52 transmits through the optical transmitters 54 information to and receives in receivers 56 information through each of the optical couplers at 72a–72c as well.

Each optical coupler 72a–72c in the simple example shown in FIG. 9 receives the two wavelength channels on each input fiber link so that all six wavelengths input to the node are "coupled."Of course, more than two wavelength channels may be multiplexed onto a single fiber.

Each optical coupler 72a–72c may be connected to two of the six tunable optical filters 62a–62f, each of which is tuned to one of the six possible wavelength channels used in this simple example. For example, tunable filters 62a and 62b select or route two particular wavelength channels from optical coupler 72a which are then combined in combiner 66a and alternately multiplexed onto output fiber link 1. Because each optical coupler receives all of the wavelength channels multiplexed on the input fiber links, any input wavelength channel on any input fiber link can be routed to any wavelength channel on any output fiber link. The tuning filter (62a–62f) and wavelength converter (64a–64f) pairs perform routing of different channels to the output fibers and wavelength switching in the wave domain, respectively. In this example, the outputs from pairs of wavelength converters 64a–64f are combined in respective optical combiners 66a–66c to reconstitute the WDM channels on each output fiber link.

Figure 10:
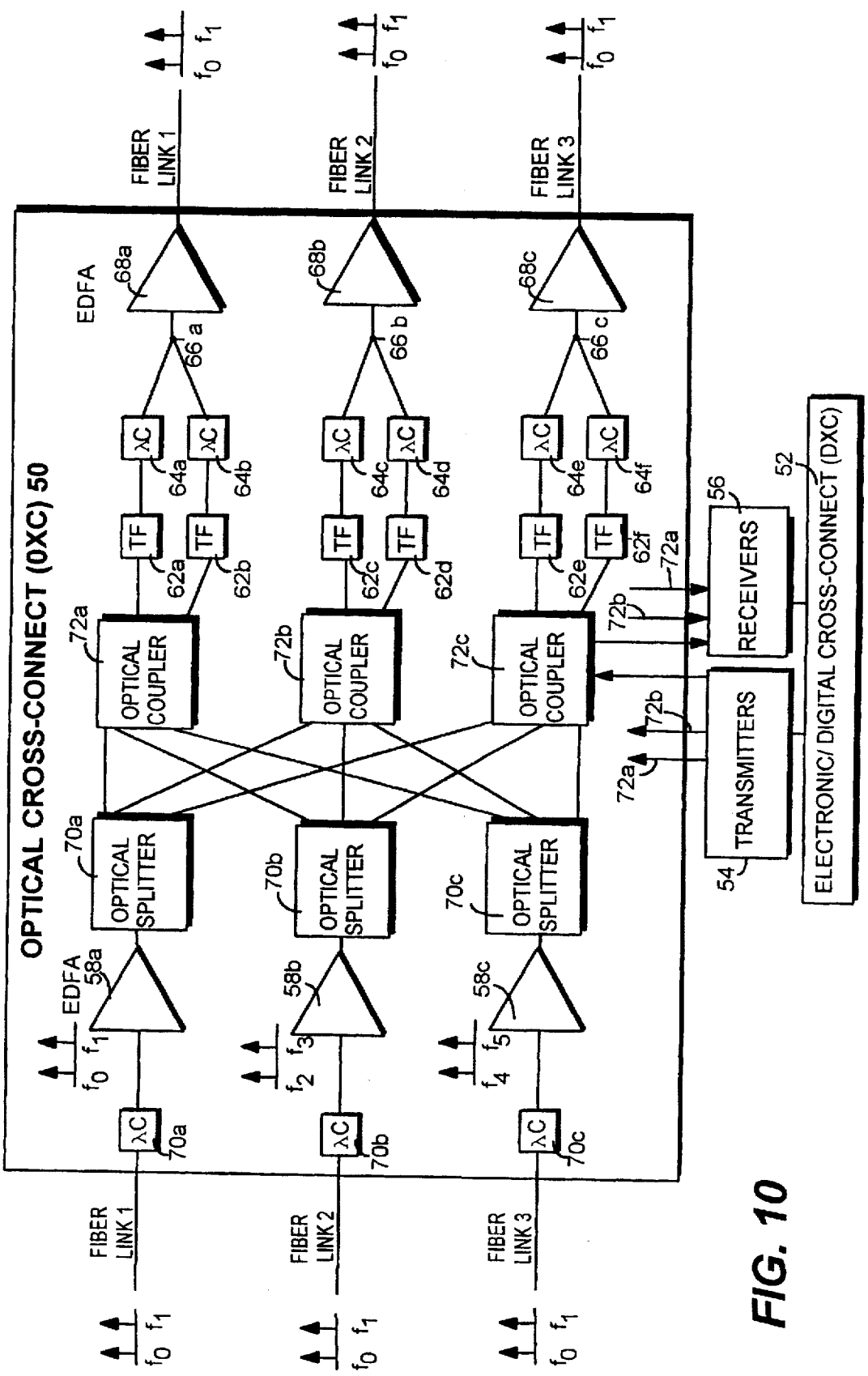
FIG. 10 is a function block diagram of a highly modular optical cross-connect architecture using wavelength switching in accordance with the fourth embodiment of the present invention.

A fourth embodiment of the present of the present invention is similar to the third embodiment of the present invention except that input wavelength converters are provided to shift the input frequencies of each optical wavelength channel to a different set of frequencies. Using the simple example from FIG. 8, FIG. 10 assumes only three fiber links with each link carrying only two wavelength channels. In contrast to FIG. 9, the two wavelength channels on each input fiber link in FIG. 10 are the same—f0 and f1. Thus, the comb of input frequencies f0 and f1 on each fiber link may be shifted by its wavelength converter 70a, 70b, or 70c to another comb or set of frequencies. In this example, the input wavelength frequencies f0 and f1 on optical link i are not translated by wavelength converter 70a (although they could be if desired). The wavelength channels f0 and f1 on optical link 2 are converted in wavelength converter 70b to frequencies f2 and f3 respectively. The wavelength channels f0 and f1 on optical link 3 are converted in wavelength converter 70c to corresponding frequencies f4 and f5 different from frequencies f2 and f3 a result, individual wavelength channels coupled in each of the optical couplers 72a–72c do not collide/contend. To accomplish such wavelength translations, FWM SOA wavelength converters are used.

As with FIG. 9, optical splitters 70a–70c provide inputs from each input fiber to all of the optical couplers 72a–72c.

Signals from digital cross-connect 52 are transmitted from transmitters 54 to each of the optical coupler 72a–72c. Optical couplers 72a–72c each provide three outputs—two outputs to two sets of tunable filter/wavelength converter pairs 62/64 and one output to the digital cross-connect receivers 56. The tuning filters 62a–62f perform routing of different channels to the output fibers, and wavelength converters 64a–64f perform wavelength switching in the wavelength domain. The wavelength converters 64a–64f may, if desired, translate the f2 and f5 channels as well as the f4 and f5 channels back to the corresponding f0 and f1 frequencies (wavelengths) which were received by wavelength converters 70. This feature permits the node wavelength switching function to remain transparent outside of the node. The outputs from pairs of wavelength converters are combined on respective combiners 66a–66c to reconstitute the WDM channels on each link.

Using the architectures of the third and fourth embodiments, the present invention provides a method of servicing an optical cross-connect node for purposes of upgrading the node by adding one or more links, performing routine maintenance on the node, or repairing/replacing one of the components in the node without having to remove the optical cross-connect node from operation. When a new link is to be added, the link may be coupled to an available input port of the existing optical coupler 60 in the first and second embodiments or to an input port of newly added, larger dimension, optical couplers in the third and fourth embodiments. In the first and second embodiments, additional tunable filter and wavelength converter pairs corresponding to the new wavelength channels carried on the new link are connected in the first and second embodiments to available output ports of optical coupler 60. Alternatively, in the third and fourth embodiments, the additional tunable filter/wavelength converter pairs are connected to output ports of the newly added optical couplers. Then the outputs from the additional wavelength converters are connected to a newly added optical combiner which combines the signals to be output on the newly added fiber link.

In the first and second embodiments, such operations typically require that the optical cross-connect node be disabled during the servicing period. However, the third and fourth embodiments permit the optical cross-connect node to remain operational. Consider the example where one of the optical couplers, e.g., 72a, must be replaced because it is faulty. The information on fiber link 1 can be routed from optical splitter 70a through either of the two remaining optical couplers 72b and 72c to one of the output fiber links 2 or 3. Alternatively, information carried on fiber link 1 could be rerouted onto input fiber links 2 and 3 for routing through optical couplers 72b and 72c. Although as presently configured in the third and fourth embodiment with each optical coupler being connected to only two tunable filters/wavelength converter pairs, it is possible that each optical coupler could be connected to all tunable filter/wavelength converter pairs to provide even greater flexibility in the event that one or more components in the optical cross-connect 50 is temporarily taken out of service. While the capacity of the optical cross-connect 50 is reduced in this example by the number of wavelength channels on fiber link 1, (i.e., only four of the six wavelength channels can be handled during the servicing period), the optical cross-connect can still be utilized by the transport network. Just as significant, information can be routed to and received from the digital cross-connect portion of the node via transmitters 54 and receivers 56 and operational optical couplers 72b and 72c.

The architectures provided by the third and fourth embodiments of the present invention therefore provide increased flexibility and operability during node upgrade and maintenance. Moreover, the use of plural optical couplers reduces the complexity and cost of existing node components in the sense that low capacity optical couplers (having a few inputs as well as only a few outputs) can be used which are must simpler and inexpensive to construct. The added modularity of the output couplers means that no particular component of the optical cross-connect node limit will by itself the capacity of the node for future upgrades.

The optical cross-connect architectures disclosed in FIGS. 4, 8, 9, and 10 are non-blocking, prevent wavelength channel contention, and are both link and wavelength modular. As a result, additional input and output fiber links can be simply inserted, with each new fiber having, for the architecture in FIG. 4, an additional corresponding tunable filter 62 and wavelength converter 64 pair. For the architecture in FIG. 8, another wavelength converter 70 is also added. In the architecture of FIG. 9, an additional optical coupler 72 is added along with the additional filter/converter pair; and in the architecture of FIG. 10, an additional wavelength converter 70 is further added. Such link and corresponding link component additions do not affect or change the pre-existing optical cross-connect node components or the node's basic structure, and as a result, the optical cross-connect is link modular.

Similarly, new wavelength channels may be individually and modularly added to the existing comb of wavelength channels on each input fiber. An added wavelength channel simply requires the addition of a tunable filter/wavelength converter pair. The total number of added filter/converter pairs equals the total number of added wavelengths without any change to the pre-existing devices. Accordingly, the optical cross-connect is wavelength modular.

In instances in the first and second embodiments where the optical coupler 60 is overdimensioned and has additional input and output ports, new links and wavelengths can be added without any change to the pre-existing OXC. Even if a higher capacity optical coupler is required to add new links and/or wavelengths, that higher capacity optical coupler is substituted for the existing coupler. The only hardware changes would be to disconnect and reconnect to the input and output coupler ports. The optical coupler is the least expensive component in the OXC and is certainly much more economically replaced than active devices like an optical space switch. The third and fourth embodiments make the architecture even more modular. Even if the plurality of less expensive and more simply dimensioned optical couplers must be replaced with greater capacity couplers in the process of adding new wavelength channels and/or links, they can be replaced one at a time to ensure that the optical cross-connect node remains operational. As a result, the optical cross-connect can be upgraded without traffic disruption and with minimum incremental/modular costs as the market demand.

Using the OXC architecture of the present invention, the optical cross-connect nodes are not network bottle-necks. In addition, in future networks such as broadband-ISDN (B-ISDN) whose initial traffic demands will likely be low, communication networks can be flexibly and economically upgraded with an optical path layer while also supporting future growth and incremental investment as traffic demands increase. The optical cross-connect architectures of the present invention offer high link and wavelength modularity. Additional links may be added to the OXC simply by adding a number of components or modules that match the number of additional links. Similarly, when adding plural wavelengths, the number of components corresponds directly to the number of additional wavelengths. The upgrading expense is confined to the cost the new link and the associated components. The node architecture need not be redesigned, nor do expensive space switches need to be purchased. Significantly, the node remains operational when new links or channels are added, maintenanced, or repaired. As already described, another advantage of these architectures is that they minimize the number of total wavelengths used in the network because they employ a virtual wavelength path technique that assigns a wavelength link-by-link rather than allocating one wavelength for every link in the network for one signal.

All the architectures in accordance with the first, second, third, and fourth embodiments directly support the possible routing of a given wavelength channel to more than one output fiber, i.e., multicasting. Moreover, any multicasted signal can travel on any wavelength independent of originating wavelength and of the other multicasted signals. This is particularly attractive for applications that require transport of signals from a production center to several access nodes in different geographic locations, e.g., broadcasting television signals. Because FWM SOA wavelength converters can translate analog signals as well as digital signals, the present invention finds particular application to multicasting of television and other signals over transport networks.

While the invention has been described in connection with what is presently considered to be the most practical and preferred embodiment, it is to be understood that the invention is not to be Limited to the disclosed embodiment, but on the contrary, is intended to cover various modifications and equivalent arrangements included within the spirit and scope of the appended claims.

What is claimed is:

1. A single stage optical cross-connect node for routing and switching wavelength communications channels at high speed, the single stage comprising:
   optical fiber input links and output links, each link containing plural wavelength channels;
   optical splitters, each optical splitter coupled to a corresponding one of the input links;
   optical star couplers coupled to each of the optical splitters, each optical star coupler receiving all wavelength channels from all of the input links;
   tunable optical filters each connected to one of the optical star couplers for selecting any one of the input wavelength channels received on any of the input links;
   optical wavelength converters each corresponding and connected to one of tunable optical filters for translating the selected wavelength channel to a different wavelength channel; and
   optical combiners for combining selected wavelength channels generated by the wavelength converters onto corresponding optical fiber output links,
   wherein the optical splitters, optical star couplers, tunable optical filters, optical wavelength converters, and optical combiners are included in the single stage.

2. The optical cross-connect node in claim 1, wherein the wavelength channels are switched in the optical cross-connect node without a space switch.

3. The optical cross connect node in claim 1, wherein the wavelength converters are four wave mixing semiconductor optical amplifiers.

4. The optical cross-connect node in claim 1, wherein the optical cross-connect is connected to an electronic cross-connect through each of the optical couplers.

5. The optical cross-connect node in claim 1, wherein one wavelength channel is routed by plural tunable filters to plural output fiber links.

6. The optical cross-connect node in claim 5, wherein the one wavelength channel routed to plural output fiber links contains analog signals.

7. An optical cross-connect node for routing and switching wavelength communications channels at high speed, comprising:
   optical fiber input links and output links, each link containing plural wavelength channels;
   optical couplers each receiving wavelength channels from the input links;
   tunable optical filters each connected to one of the optical couplers for selecting a wavelength channel;
   optical wavelength converters each corresponding and connected to one of tunable optical filters for translating the selected wavelength channel to a different wavelength channel; and
   optical combiners for combining selected wavelength channels generated by the wavelength converters onto corresponding optical fiber output links,
   wherein a new fiber link or a new wavelength channel is added to the optical cross-connect node without disabling the optical cross-connect node.

8. An optical cross-connect node for routing and switching wavelength communications channels at high speed, comprising:
   optical fiber input links and output links, each link containing plural wavelength channels;
   optical couplers each receiving wavelength channels from the input links;
   tunable optical filters each connected to one of the optical couplers for selecting a wavelength channel;
   optical wavelength converters each corresponding and connected to one of tunable optical filters for translating the selected wavelength channel to a different wavelength channel; and
   optical combiners for combining selected wavelength channels generated by the wavelength converters onto corresponding optical fiber output links,
   wherein one of the fiber links, optical converters, tunable optical filters, wavelength converters, or optical combiners is repaired without disabling the optical cross-connect node.

9. An optical cross-connect node for routing and switching wavelength communications channels at high speed, comprising:
   optical fiber input links and output links each containing a comb of plural wavelength channels;
   input wavelength converters, each connected to one of the input links being capable of converting a comb of plural wavelength channels to another comb of wavelength channels;
   optical couplers each receiving wavelength channels from the input links;
   tunable optical filters each connected to one of the optical couplers for selecting a wavelength channel;
   output optical wavelength converters each connected to a corresponding tunable optical filter for converting the selected wavelength channel to a different wavelength channel; and
   optical combiners combining wavelength channels generated by some of the wavelength converters onto corresponding ones of the optical fiber output links.

10. The optical cross-connect node of claim 9, wherein the input wavelength converters selectively convert combs of wavelength channels on each input fiber link to different combs of wavelength channels to avoid wavelength contentions in the optical couplers.

11. The optical cross-connect node of claim 10, wherein the output wavelength converters restore the wavelengths selected by the tunable filters to the wavelengths used on the input fiber links.

12. The optical cross-connect node in claim 9, wherein the wavelength channels are switched in the optical cross-connect node without a space switch.

13. The optical cross-connect node in claim 9, wherein the wavelength converters are four wave mixing semiconductor optical amplifiers.

14. The optical cross-connect node in claim 9, wherein the optical cross-connect is connected to an electronic cross-connect through the optical couplers.

15. The optical cross-connect node in claim 9, wherein a new fiber link or a new wavelength channel is modularly added to the optical cross-connect node without disabling the optical cross-connect node.

16. The optical cross-connect node in claim 9, wherein one wavelength channel is routed by plural one of the tunable filters to plural output fiber links.

17. The optical cross-connect node in claim 16, wherein the one wavelength channel routed to plural output fiber links contains analog signals.

18. A method of adding a new fiber optic link to an existing, single stage optical cross-connect node that includes optical fiber input links and output links each containing plural wavelength channels; optical splitters, each optical splitter coupled to a corresponding one of the input links; optical star couplers coupled to each of the optical splitters, each optical star coupler having an input port for each input link; tunable optical filters, each connected to one of the optical couplers for selecting any one of the input wavelength channels received on any of the input links; optical wavelength converters, each corresponding and connected to a tunable optical filter and capable of translating the selected wavelength channel to a different wavelength channel; and optical combiners for combining selected wavelength channels generated by the wavelength converters onto corresponding optical fiber output links, comprising the steps of:

coupling the new link to an available input port of one of the existing optical star couplers within the single stage or to input ports of optical star couplers newly added to the single stage;

coupling in the single stage an additional tunable filter and corresponding additional wavelength converter associated with each new wavelength channel carried on the new link to an available output port of each existing optical star coupler or to an output port of each newly added optical star coupler; and connecting an output from the additional wavelength converter to an additional optical combiner added to the single stage.

19. The method in claim 18, further comprising:
maintaining operation of the single stage optical cross connect node when the new link is being added.

20. A method of adding a new wavelength channel to an existing, single stage optical cross-connect node that includes optical fiber input links and output links each containing plural wavelength channels; optical splitters, each optical splitter coupled to a corresponding one of the input links; optical star couplers coupled to each of the optical splitters, each optical star coupler having an input port for each input link; tunable optical filters, each connected to one of the optical couplers for selecting any one of the input wavelength channels received on any of the input links; optical wavelength converters, each corresponding and connected to a tunable optical filter and capable of translating the selected wavelength channel to a different wavelength channel; and optical combiners for combining selected wavelength channels generated by the wavelength converters onto corresponding optical fiber output links, comprising the steps of:

coupling in the single stage an additional tunable filter and corresponding additional wavelength converter associated with the new wavelength channel to an available output port of each existing optical star coupler or to an output port of each newly added optical star coupler; and connecting an output from each additional wavelength converter to a corresponding optical combiner added to the single stage.

21. A method of adding a new fiber optic link to an existing optical cross-connect node that includes optical fiber input links and output links each containing plural wavelength channels; input wavelength converters, each connected to one of the input links and capable of converting a comb of plural wavelength channels to another comb of wavelength channels; optical couplers having an input port for each input link; tunable optical filters, each connected to one of the optical couplers for selecting a wavelength channel; output optical wavelength converters, each corresponding and connected to each tunable optical filter and capable of translating the selected wavelength channel to a different wavelength channel; and optical combiners for combining selected wavelength channels generated by the wavelength converters onto corresponding optical fiber output links, comprising the steps of:

coupling the link through an additional input wavelength converter to an available input port of the existing optical couplers or to input ports of newly added optical couplers;

coupling an additional tunable filter and corresponding additional output wavelength converter associated with each new wavelength channel carried on the new link to an available output port of each existing optical coupler or to an output port of each newly added optical coupler; and connecting an output from each additional wavelength converter to an additional optical combiner.

22. The method in claim 21, further comprising:
maintaining operation of the optical cross-connect node when the new link is being added.

23. A method of adding a new wavelength channel to an existing optical cross-connect node that includes optical fiber input links and output links each containing plural wavelength channels; input wavelength converters, each connected to one of the input links and capable of converting a comb of plural wavelength channels to another comb of wavelength channels; optical couplers having an input port for each input link; tunable optical filters, each connected to one of the optical couplers for selecting a wavelength channel; output optical wavelength converters, each corresponding and connected to each tunable optical filter and capable of translating the selected wavelength channel to a different wavelength channel; and optical combiners for combining selected wavelength channels generated by the wavelength converters onto corresponding optical fiber output links, comprising the steps of:

determining that a new wavelength channel is to be added to one of the input links;

coupling an additional tunable filter and corresponding additional output wavelength converter associated with the new wavelength channel to an available output port of the existing optical couplers or to an output port of each newly added optical coupler; and connecting an output from each additional wavelength converter to a corresponding optical combiner.

24. A method of servicing an optical cross-connect node that includes optical fiber input links and output links each containing plural wavelength channels; input wavelength converters, each connected to one of the input links and capable of converting a comb of plural wavelength channels to another comb of wavelength channels; optical couplers having an input port for each input link; tunable optical filters, each connected to one of the optical couplers for selecting a wavelength channel; output optical wavelength converters, each corresponding and connected to each tunable optical filter and capable of translating the selected wavelength channel to a different wavelength channel; and optical combiners for combining selected wavelength channels generated by the wavelength converters onto corresponding optical fiber output links, comprising the steps of:

disabling one of the optical links, optical couplers, tunable optical filters, wavelength converters, or optical combiners;

servicing the disabled one of the optical links, optical couplers, tunable optical filters, wavelength converters, or optical combiners; and during the servicing step, maintaining operation of the optical cross-connect node by routing information using an enabled optical link, optical coupler, tunable filter, wavelength converter, and optical combiner.

* * * * *